Sept. 23, 1969          S. C. BELL          3,468,878
PROCESS FOR PREPARING 3-ACYLOXY-1,3-DIHYDRO
-5-ARYL-2H-1,4-BENZODIAZEPIN-2-ONES
Original Filed Aug. 13, 1963
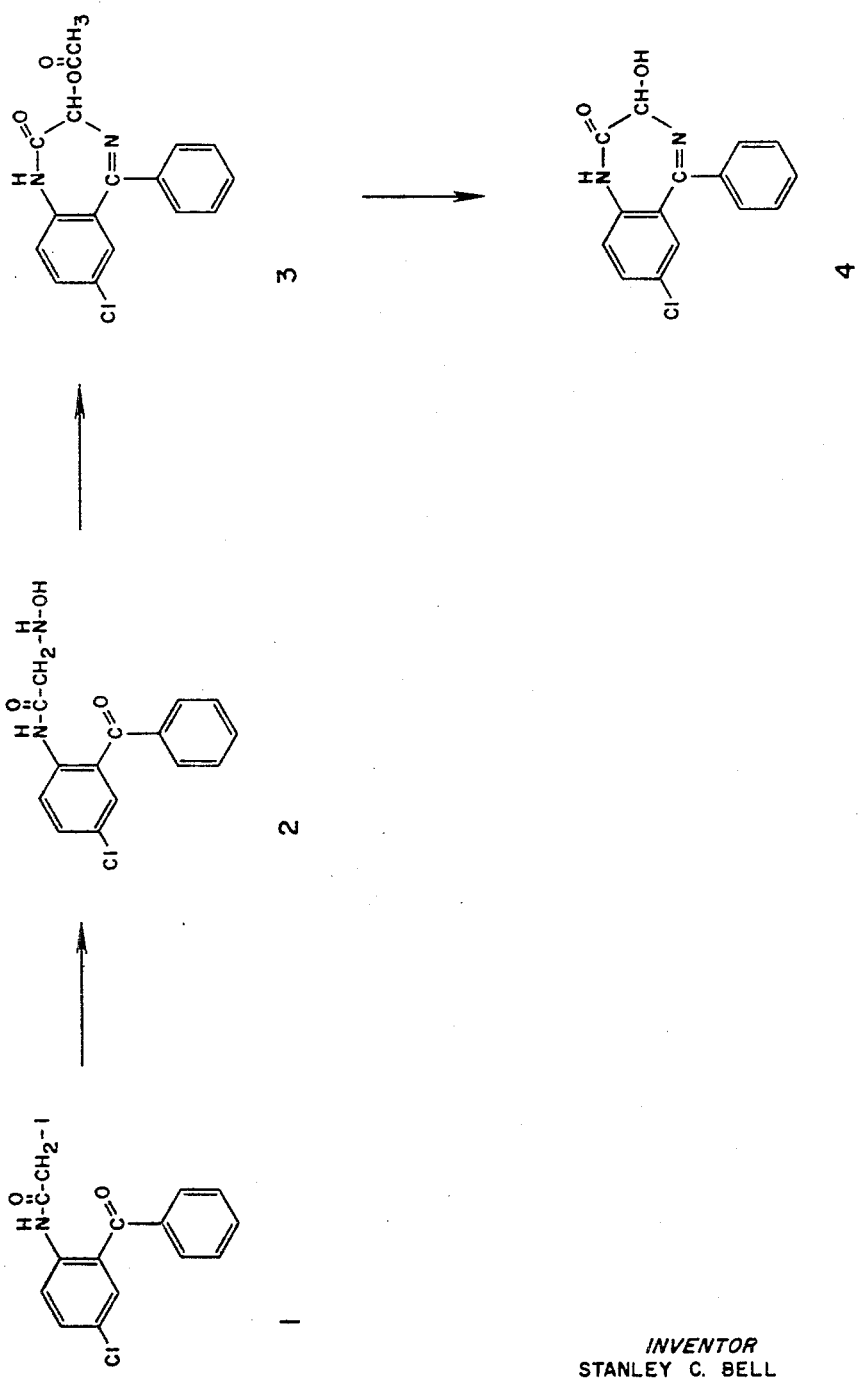
INVENTOR
STANLEY C. BELL
BY Vito Victor Bedino
ATTORNEY

United States Patent Office 3,468,878
Patented Sept. 23, 1969

3,468,878
PROCESS FOR PREPARING 3 - ACYLOXY-1,3-DIHYDRO - 5 - ARYL-2H-1,4-BENZODIAZEPIN-2-ONES
Stanley C. Bell, Philadelphia, Pa., assignor to American Home Products Corporation, New York, N.Y., a corporation of Delaware
Original application Aug. 13, 1963, Ser. No. 301,771. Divided and this application Jan. 21, 1966, Ser. No. 522,271
The portion of the term of the patent subsequent to Apr. 11, 1984, has been disclaimed
Int. Cl. C07d 53/06; A61k 27/00
U.S. Cl. 260—239.3                5 Claims

ABSTRACT OF THE DISCLOSURE

A process is described for preparing 3-acyloxy-1,3-dihydro-5-aryl - 2H-1,4-benzodiazepin-2-ones which possess and which are convertible to compounds which possess psycholeptic effects. The process consists of a sequence of reactions including the steps of treating a 2-hydroxyaminoacetamido aryl ketone with hydroxylamine and treating the product in an acid cyclizing medium with an acylating agent.

---

This application is a division of my co-pending application Ser. No. 301,771, filed Aug. 13, 1963, now abandoned, which is a continuation-in-part of applications Ser. No. 283,966 and Ser. No. 283,967, both filed May 29, 1963, and now abandoned.

This invention relates to novel processes for preparing compositions of matter classified in the art of chemistry as substituted benzodiazepines, and to novel intermediates for their preparation.

The invention sought to be patented, in a principal process aspect, is described as residing in the concept of the sequence of reactions including: converting the 2-haloacetamido radical attached in the 2-position of the benzophenone nucleus to the 2-hydroxyaminoacetamido radical by treatment of the benzophenone compound with hydroxylamine; isolating the so-formed 2-(2-hydroxyaminoacetamido)benzophenone; and, treating said so-formed benzophenone in an acid cyclizing medium with an acylating agent.

The invention sought to be patented in a second principal process aspect is described as residing in the concept of treating 2-(2-hydroxyaminoacetamido)benzophenone in an acid cyclizing medium with an acylating agent under anhydrous conditions.

The invention sought to be patented, in its principal composition aspect, is described as residing in the concept of 2-(2-hydroxyaminoacetamido)benzophenone.

The tangible embodiments of the composition aspect of the invention possess the inherent general physical properties of being crystalline solids. Examination of compounds produced according to the hereinafter described process reveals upon nuclear magnetic resonance, ultraviolet and infrared spectrographic analyses, spectral data confirming the molecular structure hereinbefore set forth. For example, the

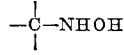

frequency characteristic of the compounds is evident. The aforementioned physical characteristics, taken together with the nature of the starting materials, the mode of synthesis and reactions of the compositions sought to be patented positively confirm their structure.

The tangible embodiments of the compositions of the present invention possess the inherent applied use characteristics of intermediates for the preparation of valuable 3-acyloxy- and 3-hydroxy-5-phenyl - 1,3-dihydro-2H-1,4-benzodiazepin-2-ones which possess the inherent applied use characteristics of exerting a psycholeptic effect in mammals, as evidenced by evaluation according to standard test procedures.

The manner and process of making and using the process and compositions of the invention will now be generally described so as to enable a person skilled in the art of chemistry to make and use a specific embodiment of the same, as follows:

The new processes of our invention are illustrated schematically for a specific embodiment thereof, in FIGURE 1 of the attached drawing, to which the numerals in parentheses in the following description refer.

When a 2-(2-haloacetamido)benzophenone (1) is treated with hydroxylamine, or an acid-addition salt thereof, under the hereinafter described conditions, I have discovered that, contrary to what would be expected by one with ordinary skill in the art of chemistry, even in the presence of a large excess of the hydroxylamine a substantially selective displacement of halogen occurs and surprisingly, a good yield of 2-(2-hydroxyaminoacetamido)phenyl aryl ketone (2) is obtained instead of the classical ketone-hydroxylamine reaction derivative, i.e., the corresponding oxime. This reaction is preferably performed at a pH range of from about 4 to about 9 in a solvent mixture comprising water and a water-soluble organic solvent such as methanol, ethanol, dioxane, or dimethylformamide, in order to obtain optimum yield. The reaction may also be run in non-aqueous media, with or without a water-soluble organic solvent. Preferably the reaction is conducted at temperatures ranging from about 30° C. to the reflux temperature of the solvent mixture for a period of time ranging from about one-quarter to about two hours. The reaction mixture is then diluted with water to precipitate the 2-(2-hydroxyaminoacetamido)phenyl aryl ketone (2) in a readily isolatable form. Treating a hot solution of said isolated ketone in an acid cyclizing medium, for example, one containing an acid such as acetic, sulfuric, benzenesulfonic, para-toluenesulfonic, or hydrogen chloride, with an acylating agent such as an anhydride or a halide of a carboxylic acid, for example acetic, propionic, caproic, benzoic, toluic, phenylacetic, cinnamic, aminobenzoic, chloracetic, bromobenzoic, etc., or an in situ ketene generator such as isopropenyl acetate under substantially anhydrous conditions and heating, forms a 3-acyloxy-1,3-dihydro - 5-phenyl-2H-1,4-benzodiazepin-2-one (3). The solvent used must be unreactive with respect to the acylating agent, and therefore cannot be a solvent such as water or alcohol. On cooling and diluting with water the product compound is precipitated. This compound may be saponified as with an alkali metal hydroxide to give the corresponding 3-hydroxy-1,3-dihydro - 5-aryl-2H-1,4-benzodiazepin-2-one (4).

The 2-(2-haloacetamido)phenyl aryl ketones employed as starting materials in conducting our process are known or are readily prepared by procedures known to those skilled in the art.

It will be apparent from the disclosure herein to those skilled in the art of organic chemistry that for the purposes of this invention certain of the carbon and nitrogen atoms of the 2-(2-haloacetamido)phenyl mono-cyclic aryl ketones employed as starting materials can be substituted with groups of a character such that they do not interfere with the hydroxyamination reaction involving the 2-halo atom. However, the 2-carbon of the acetamido group, i.e. the carbon to which the halo and the carbonyl atoms are attached, can additionally bear only hydrogen atoms. The acetamido nitrogen in the 2-(2-haloacetamido)phenyl mono-cyclic aryl ketones and in the 2-(2-hydroxyaminoacetamido)phenyl mono-cyclic aryl ketones formed as intermediates can bear hydrogen or there can be substituted for the hydrogen an alkyl group, such as methyl, ethyl, isopropyl, or, an alkenyl group such as allyl or methallyl, or, a lower aralkyl group such as benzyl or phenethyl. Therefore in the processes of the invention, except for any limitations expressed in this specification, all 2-(2-haloacetamido)phenyl mono-cyclic aryl ketones however substituted can be employed as starting materials in the process of making aspect of this invention.

The phenyl ring bearing the acetamido group can have one or more substituents other than hydrogen, as for example, but without limitation, lower alkyl, chlorine, bromine, trifluoromethyl or methylsulfonyl at the 3-, 4-, 5-, or 6-positions, and such substituents do not interfere with the course of the reactions here involved. The aryl group can be phenyl, 2- or 3-thienyl; 2- or 3-furyl; 2-, 3-, or 4-pyridyl; or 1- or 2-naphthyl. The phenyl nucleus of the phenyl-keto group can bear one or more simple substituents inert in the reactions herein described, such as lower alkyl, chlorine, bromine, trifluoromethyl, or methylsulfonyl and such substituted phenyl-keto compounds are full equivalents of the unsubstituted phenyl nucleus for the purposes of the present invention.

From the disclosure herein illustrating the invention as applied to starting materials which produce compounds wherein the 5-position substituent is phenyl or substituted phenyl, it will be apparent to organic chemists that other mono-cyclic-aryl nuclei can be in the starting materials in lieu of phenyl without affecting the course of the reactions involving the hydroxy amination and the subsequent isolation and ring closure. Accordingly, the use in such reactions of starting materials wherein the phenyl group is replaced by 2- or 3-thienyl; 2- or 3-furyl; and 2-, 3-, or 4-pyridyl radicals is the full equivalent of the invention as particularly claimed.

When the starting compounds are substituted as hereinbefore recited, it will be apparent therefrom to those skilled in the art of chemistry that the intermediate compounds and the final products formed by the process of the invention will bear, correspondingly, the same substituents.

It also will be apparent herefrom to one skilled in the art of organic chemistry that the hereinbefore described starting compounds, namely, the 2-(2-haloacetamido) phenyl mono-cyclic aryl ketones can be either 2-(2-chloroacetamido)phenyl aryl ketones, 2-(2-bromoacetamido) phenyl aryl ketones or 2-(2-iodoacetamido)phenyl aryl ketones, namely those subject to nucleophilic displacement or the equivalent thereof such as 2-(2-tosyloxyacetamido) phenyl mono-cyclic aryl ketones. For best results when using the chloro- and bromo- compounds, it is preferred, though not essential, to add a small amount of a water-soluble iodide salt such as sodium or potassium iodide.

The following example illustrates the best mode contemplated by the inventor of using the claimed process of the invention and of the manner of making and using a specific embodiment of the claimed compositions of the invention.

Example 1

(A) Stir a mixture of 5.0 g. of 5-chloro-2-(2-iodoacetamido)benzophenone, 7.0 g. of hydroxylamine hydrochloride, 20 ml. of water, 20 ml. of 4 N sodium hydroxide solution, and 60 ml. of dimethylformamide at room temperature for one-half hour to obtain a clear solution. Add 100 ml. of water, collect the resultant precipitated solid and recrystallize from benzene to obtain pure 5-chloro-2-(2-hydroxyaminoacetamido)benzophenone, M.P. 129–131° C.

Analysis for $C_{15}H_{13}ClN_2O_3$.—Calcd.: C, 59.10; H, 4.30; Cl, 11.64; N, 9.21. Found: C, 59.38; H, 4.16; Cl, 11.70; N, 9.00.

(B) To a refluxing solution of 1.0 g. 5-chloro-2-(2-hydroxyaminoacetamido)benzophenone in 10 ml. of acetic acid add 1 ml. of acetic anhydride and heat for 30 minutes. Cool the reaction mixture and dilute with 10 ml. of water to precipitate 3-acetoxy-7-chloro-1,3-dihydro-5-phenyl-2H-1,4-benzodiazepin-2-one, M.P. 241–243° C.

The following example further illustrates a claimed process and the method for preparing the compositions of our invention.

Example 2

Stir a mixture of 4.0 g. of 5-chloro-2-(2-chloroacetamido)benzophenone, 7.0 g. of hydroxylamine hydrochloride, 10 ml. of water, 20 ml. of 4 N sodium hydroxide, and 0.2 g. of sodium iodide in 100 ml. of dimethylformamide at 50° C. for 30 minutes to obtain a clear solution. Add 100 ml. of water, cool, and recrystallize the resultant precipitate to obtain 5-chloro-2-(2-hydroxyaminoacetamido)benzophenone, M.P. 129–131° C.

To prepare 2 - (2 - hydroxyaminoacetamido)benzophenone treat 2 - (2 - chloroacetamido)benzophenone by the procedure described above.

To prepare 5-chloro - 2 - (2 - hydroxyaminoacetamido) phenyl 2-thienyl ketone treat 2-(2-chloroacetamido)-5-chlorophenyl 2-thienyl ketone by the procedure described above.

To prepare 5-chloro - 2 - (2 - hydroxyaminoacetamido) phenyl o-chlorophenyl ketone treat 2-(2-chloroacetamido) - 5 - chlorophenyl o-chlorophenyl ketone by the procedure described above.

To prepare 4,5-dichloro-2-(2-hydroxyaminoacetamido) benzophenone treat 4,5-dichloro-2-(2 - chloroacetamido) benzophenone by the procedure described above.

To prepare 5 - chloro - 2 - (N-methyl-2-hydroxyaminoacetamido)benzophenone treat 5-chloro - 2 - (N-methyl-2-chloroacetamido)benzophenone by the procedure described above.

The following example further illustrates the method for using the compositions of our invention.

Example 3

To a refluxing solution of 1.0 g. 5-chloro-2-(2-hydroxyaminoacetamido)benzophenone in 10 ml. of dioxane containing hydrogen chloride add 1 ml. of acetic anhydride and heat for 30 minutes. Cool the reaction mixture and dilute with 10 ml. of water to precipitate 3-acetoxy-7-chloro - 1,3 - dihydro - 5 - phenyl - 2H - 1,4 - benzodiazepin-2-one.

To prepare 3-acetoxy-1,3-dihydro-5-phenyl-2H-1,4-benzodiazepin-2-one, M.P. 229–31° C., treat 2-(2-hydroxyaminoacetamido)benzophenone by the procedure described in 1(B).

To prepare 3 - acetoxy - 7 - chloro - 1,3 - dihydro - 5-(2-thienyl)-2H-1,4-benzodiazepin-2-one, M.P. 269° C., treat 5 - chloro - 2 - (2 - hydroxyaminoacetamido)phenyl 2-thienyl ketone by the procedure described in 1(B).

To prepare 3-acetoxy-7-chloro-1,3-dihydro-5-o-chlorophenyl-2H-1,4-benzodiazepin-2-one, M.P. 262–264° C., treat 5 - chloro - 2 - (2 - hydroxyaminoacetamido)phenyl o-chlorophenyl ketone by the procedure described in 1(B).

To prepare 3 - acetoxy - 7,8 - dichloro - 1,3 - dihydro-5-phenyl-2H-1,4-benzodiazepin-2-one treat 4,5-dichloro-2-(2-hydroxyaminoacetamido)benzophenone by the procedure described in 1(B).

To prepare 7-chloro-1,3-dihydro-5-phenyl-3-propionoxy-2H-1,4-benzodiazepin-2-one treat 5-chloro-2-(2-hydroxyaminoacetamido)benzophenone with propionic anhydride by the procedure described in 1(B).

To prepare 3-benzoxy-7-chloro-1,3-dihydro-5-phenyl-2H-1,4-benzodiazepin-2-one, M.P. 251–252° C., treat 5-chloro-2 - (2 - hydroxyaminoacetamido)benzophenone with benzoic acid anhydride by the procedure described in 1(B).

To prepare 7-chloro-1,3-dihydro-3-α-chloro-acetoxy-5-phenyl-2H-1,4-benzodiazepin-2-one, M.P. 230–231° C., treat 5 - chloro - 2 - (2 - hydroxyaminoacetamido)benzophenone with α-chloroacetic acid anhydride by the procedure described in 1(B).

To prepare 3-chloroacetoxy-7,8-dichloro-1,3-dihydro-5-phenyl-2H-1,4-benzodiazepin-2-one treat 4,5-dichloro-2-(2-hydroxyaminoacetamido)benzophenone with chloroacetyl chloride by the procedure described in 1(B).

The subject matter which the applicant regards as his invention is particularly pointed out and distinctly claimed as follows:

1. The process for preparing 3-acyloxy-1,3-dihydro-5-phenyl-2H-1,4-benzodiazepin-2-one comprising: converting the 2-haloacetamido radical, which is attached in the 2-position of the benzophenone nucleus, to the 2-hydroxyaminoacetamido radical by treatment of the benzophenone compound with hydroxylamine; isolating the so-formed 2 - (2 - hydroxyaminoacetamido)benzophenone; and treating said so-formed benzophenone in an acid cyclizing medium with an acylating agent.

2. The process of claim 1 wherein the acetamidophenyl of the 2-(2-haloacetamido)benzophenone is substituted with chlorine at the 5-position.

3. The process for preparing 3-acyloxy-1,3-dihydro-5-phenyl-2H-1,4-benzodiazepin-2-one comprising: treating 2-(2-hydroxyaminoacetamido)benzophenone in an acid cyclizing medium with an acylating agent under anhydrous conditions.

4. The process of claim 3 wherein the acetamidophenyl of the 2-(2-hydroxyaminoacetamido)benzophenone is substituted with chlorine at the 5-position.

5. The process of claim 4 wherein the cyclizing medium contains acetic acid.

References Cited
UNITED STATES PATENTS

| | | | |
|---|---|---|---|
| 3,296,244 | 1/1967 | Bell | 260—239.3 |
| 3,198,789 | 8/1965 | Bell | 260—239.3 |
| 3,313,805 | 4/1967 | Bell | 260—239.3 |

HENRY R. JILES, Primary Examiner

R. T. BOND, Assistant Examiner

U.S. Cl. X.R.

260—295, 332.2, 347.3, 456, 562; 424—244